(12) United States Patent
Bagwell

(10) Patent No.: US 11,010,907 B1
(45) Date of Patent: May 18, 2021

(54) BOUNDING BOX SELECTION

(71) Applicant: Zoox, Inc., Foster City, CA (US)

(72) Inventor: Carden Taylor Bagwell, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 129 days.

(21) Appl. No.: 16/201,842

(22) Filed: Nov. 27, 2018

(51) Int. Cl.
| | |
|---|---|
| *G06T 7/277* | (2017.01) |
| *G06K 9/62* | (2006.01) |
| *G05D 1/02* | (2020.01) |
| *G06T 7/50* | (2017.01) |
| *G06T 7/70* | (2017.01) |

(52) U.S. Cl.
CPC ........... *G06T 7/277* (2017.01); *G05D 1/0221* (2013.01); *G05D 1/0231* (2013.01); *G06K 9/6228* (2013.01); *G06T 7/50* (2017.01); *G06T 7/70* (2017.01); *G05D 2201/0213* (2013.01); *G06T 2207/10028* (2013.01); *G06T 2207/20081* (2013.01); *G06T 2207/30241* (2013.01); *G06T 2207/30252* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,395,529 | B2* | 3/2013 | Seder | G08G 1/166 340/905 |
| 9,523,772 | B2* | 12/2016 | Rogan | G01S 17/89 |
| 9,633,483 | B1* | 4/2017 | Xu | G06T 17/10 |
| 9,934,440 | B1 | 4/2018 | Kim et al. | |
| 10,444,759 | B2* | 10/2019 | Douillard | G06K 9/00791 |
| 10,535,138 | B2* | 1/2020 | Pfeiffer | G06T 7/11 |
| 10,599,150 | B2 | 3/2020 | Graham et al. | |
| 2010/0253595 | A1* | 10/2010 | Szczerba | G01S 13/931 345/7 |
| 2010/0253600 | A1* | 10/2010 | Seder | G02B 1/115 345/7 |
| 2010/0289632 | A1* | 11/2010 | Seder | G02B 27/01 340/436 |

(Continued)

OTHER PUBLICATIONS

U.S. Appl. No. 15/622,905, filed Jun. 14, 2017, Douillard, et al., "Voxel Based Ground Plane Estimation and Object Segmentation", 74 pages.

(Continued)

*Primary Examiner* — Tsung Yin Tsai
(74) *Attorney, Agent, or Firm* — Lee & Hayes, P.C.

(57) ABSTRACT

Techniques to train a model with machine learning and use the trained model to select a bounding box that represents an object are described. For example, a system may implement various techniques to generate multiple bounding boxes for an object in an environment. Each bounding box may be slightly different based on the technique and data used. To select a bounding box that most closely represents an object (or is best used for tracking the object), a model may be trained. The model may be trained by processing sensor data that has been annotated with bounding boxes that represent ground truth bounding boxes. The model may be implemented to select a most appropriate bounding box for a situation (e.g., a given velocity, acceleration, distance, location, etc.). The selected bounding box may be used to track an object, generate a trajectory, or otherwise control a vehicle.

20 Claims, 7 Drawing Sheets

(56) References Cited

U.S. PATENT DOCUMENTS

| | | | |
|---|---|---|---|
| 2014/0270484 A1* | 9/2014 | Chandraker | G06T 7/277 |
| | | | 382/154 |
| 2016/0086052 A1* | 3/2016 | Piekniewski | H04N 9/7973 |
| | | | 382/103 |
| 2018/0232947 A1* | 8/2018 | Nehmadi | G01S 17/931 |
| 2018/0232948 A1* | 8/2018 | Hong | G06F 30/13 |
| 2019/0147610 A1* | 5/2019 | Frossard | G06T 7/70 |
| | | | 382/103 |
| 2019/0162856 A1* | 5/2019 | Atalla | G01S 17/86 |
| 2019/0243371 A1* | 8/2019 | Nister | G05D 1/0231 |
| 2019/0250622 A1* | 8/2019 | Nister | B60W 60/0015 |
| 2019/0258251 A1* | 8/2019 | Ditty | G05D 1/0274 |
| 2019/0258878 A1 | 8/2019 | Koivisto et al. | |
| 2019/0286153 A1* | 9/2019 | Rankawat | G06T 7/11 |
| 2019/0332118 A1* | 10/2019 | Wang | G05D 1/0238 |
| 2019/0391578 A1 | 12/2019 | Tariq et al. | |
| 2020/0111267 A1 | 4/2020 | Stauber et al. | |

OTHER PUBLICATIONS

U.S. Appl. No. 15/963,833, filed Apr. 26, 2018, Wang, et al., "Data Segmentation Using Masks", 38 pages.

\* cited by examiner

BOUNDING BOX SELECTION

BACKGROUND

Many applications use information about three-dimensional objects that are present in an environment. For example, various autonomous systems, such as autonomous vehicles and autonomous drones, use three-dimensional data of objects to navigate within an environment. To do so, such autonomous systems determine information about the objects, including information about the size and location of the objects, for example. These systems often use a three-dimensional bounding box as a representation of a three-dimensional object. In some instances, a system includes various components that generate multiple three-dimensional bounding boxes for an object. However, object tracking and other processes often rely on a single three-dimensional bounding box for an object.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
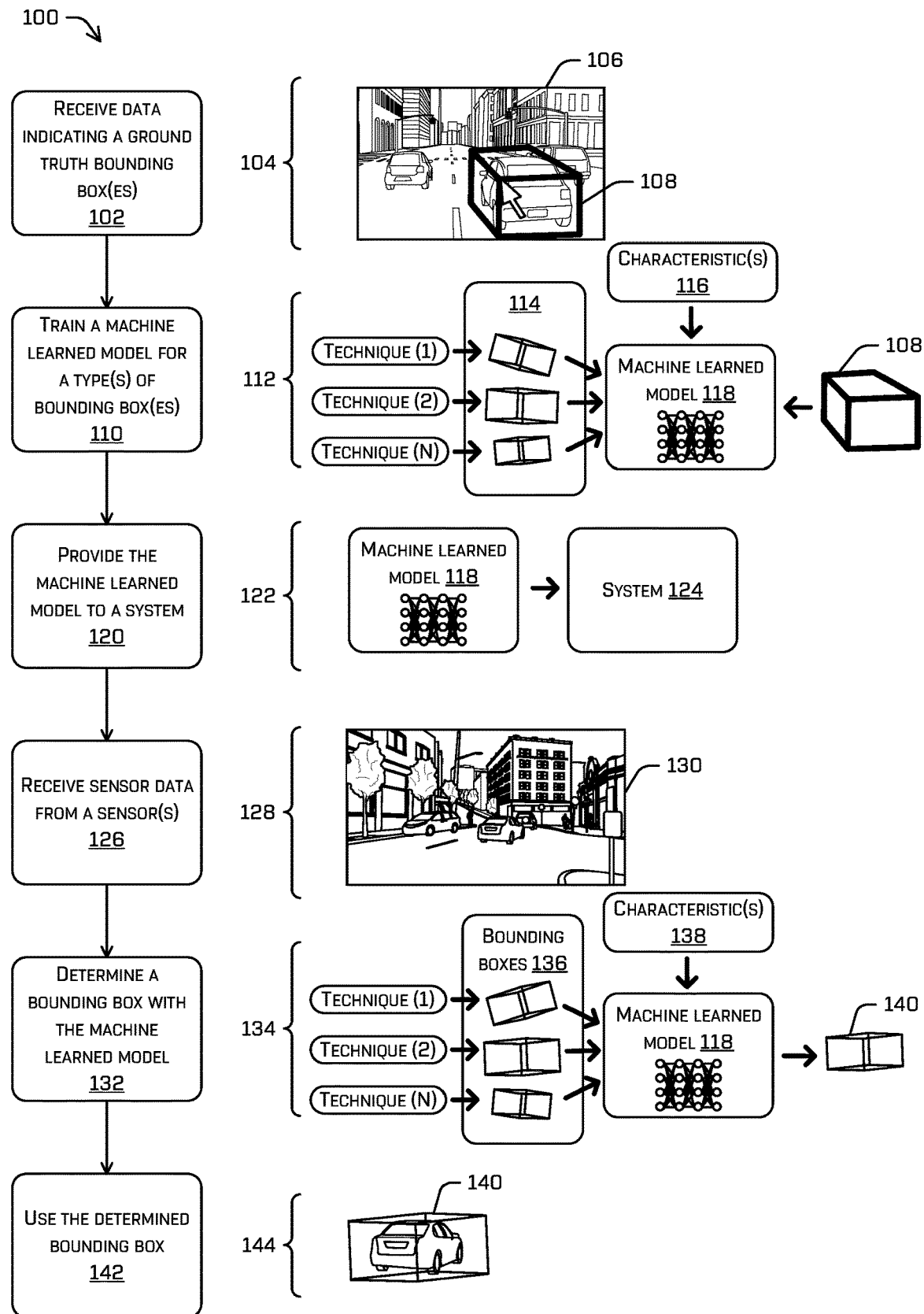
FIG. 1 illustrates a pictorial flow diagram of an example process for training a model and using the model to select a bounding box.

This disclosure is directed to training a model with machine learning and using the trained model to output a bounding box that represents an object in an environment. For example, a system, such as an autonomous vehicle, may implement various techniques that independently (or in cooperation) capture and/or process sensor data of an environment to generate multiple bounding boxes for objects in the environment. The techniques may often generate many bounding boxes for a same object. Such bounding boxes may include slight variations, such as different sizes, shapes, orientations, positions, confidence levels, etc. To output a bounding box that most closely represents an object, a model may be trained with machine learning. The model may be trained by processing sensor data that has been annotated by a human or otherwise with bounding boxes that represent ground truths. The model may then be used during runtime to output a most appropriate bounding box for a situation. For example, the model may select or generate the most appropriate bounding box based on a velocity of a vehicle or object, a distance from a vehicle to an object, a proximity to a road feature (e.g., intersections, parking lanes, signal lights, stop signs, etc.), a geolocation, a confidence, an amount of empty space within a bounding box, and so on. The output bounding box may be used to track an object (e.g., update a state of an object tracker), generate a trajectory, or otherwise control the vehicle. By training and using such model, the techniques discussed herein may more accurately identify a bounding box to use for an object, in comparison to previous techniques.

In examples, a computing device may train a model based on ground truth data and data determined by an existing perception system that is implemented for a vehicle. For instance, a user may view sensor data previously captured by a vehicle to annotate the sensor data with ground truth bounding boxes for objects represented in the sensor data. The annotated data may be provided to the computing device. In other instances, another entity, such as an application, may provide annotated sensor data to the computing device. Additionally, or alternatively, the computing device may process the sensor data with an existing perception system to determine tracks for objects represented in the sensor data and bounding boxes for the objects. A track of an object may represent a current or previous position, velocity, acceleration, orientation, and/or heading of the object over a period of time (e.g., 5 seconds). In examples, the computing device may process the sensor data with various techniques to generate various types of bounding boxes. Each bounding box may be associated with a track for an object. In many examples, bounding boxes of different types may be associated with a same track, such as bounding boxes generated by different techniques.

In examples, to generate training data to train a model, the computing device may determine similarities between ground truth bounding boxes and tracks determined by the existing perception system. For example, the computing device may determine a first score between a ground truth bounding box and a first object track determined by the perception system. The computing device may also determine a second score between the ground truth bounding box and a second object track. A score may indicate how closely a ground truth bounding box matches a bounding box associated with an object track. In this example, the ground truth bounding box is more similar to the first object track than the second object track, and as such, the first score is greater than the second score. Here, the computing device may identify the first object track as the most similar track to the ground truth bounding box based on the first score being greater than the second score.

The computing device may then train a model to output a bounding box that is most appropriate for a situation in which the sensor data was captured. For example, the computing device may determine one or more characteristics associated with the situation in which the sensor data was captured, such as a velocity of an object or a vehicle when the sensor data was captured, a distance from the vehicle to an object when the sensor data was captured, how long a track has been present in the computing device, a proximity of the vehicle or the object to a road feature (e.g., intersection, parking lane, etc.) when the sensor data was captured, a geolocation of the vehicle, a confidence associated with a technique that generated a bounding box, a ratio of empty space to occupied space within a bounding box associated with the sensor data, etc. The computing device may use the one or more characteristics, a ground truth bounding box, and/or data for a track that is most similar to the ground truth bounding box (e.g., bounding boxes associated with the track) to train a model to output the bounding box. In one example, the model may be trained to select a particular type of bounding box that is generated by a perception system (e.g., a bounding box that is generated with a particular technique). In another example, the model may be trained to determine (e.g., generate) a new bounding box to be output (e.g., generate an output bounding box that is a variation of a bounding box generated by a perception system). In some instances, the model comprises a machine learned model, such as a neural network.

In examples, a system may use a trained model to output an appropriate bounding box for a situation. For instance, the system may capture sensor data with one or more sensors of the system, such as LIDAR sensors, radio detection and ranging (RADAR) sensors, image sensors, depth sensors (time of flights, structured light, etc.), and the like. A perception system may process the sensor data to generate multiple bounding boxes for objects represented in the sensor data. The bounding boxes may be generated with different techniques. The perception system may also determine one or more characteristics associated with a situation in which the sensor data was captured, such as a velocity of an object or a vehicle, a distance from the vehicle to an object, a geolocation, a confidence, etc. The system may input multiple types of bounding boxes generated for an object and/or the one or more characteristics into the trained model. The trained model may output a bounding box that is most appropriate for the one or more characteristics. In one example, the trained model may select one of the input bounding boxes as an output bounding box. In another example, the trained model may determine an output bounding box based on one or more of the input bounding boxes (e.g., the output bounding box being an average of input boxes) and output the output bounding box. The perception system may then update the track to designate the output bounding box for tracking (also referred to as "state update" or "track update" for an object tracker). That is, the output bounding box may be used to track the object and/or perform other operations related to the object or controlling the vehicle.

In one example of training and implementing a model, a computing device receives annotated data from a user for sensor data previously captured by a vehicle. In this example, the annotated data includes a ground truth bounding box around another vehicle, as well as other ground truth bounding boxes for other objects. Here, the computing device may process the sensor data with a perception system to generate multiple tracks and multiple bounding boxes for each of the tracks. The computing device may determine that the ground truth bounding box for the other vehicle is most similar to a particular track of the multiple tracks generated by the perception system. In this example, the particular track is associated with five bounding boxes, with each of the five bounding boxes being generated with a different technique. Here, the computing device may determine that the ground truth bounding box for the other vehicle is most similar to the third bounding box of the five bounding boxes associated with the particular track. The third bounding box may be associated with a particular type of technique (e.g., a LIDAR-based generation technique).

In this example, the computing device may then determine characteristics associated with the sensor data. Here, the computing device determines that the vehicle was moving at a speed of 35 miles per hour when the sensor data was captured. As such, the computing device may train a model based on the characteristic (e.g., a velocity of 35 miles per hour) and the particular type of technique that was used to generate the third bounding box. Specifically, the computing device may train the model to select the particular type of bounding box (e.g., a bounding box generated by a LIDAR-based technique) when the vehicle is traveling at 35 miles per hour in the future. In other examples, the machine learned model may be trained to output a new bounding box that is based at least in part on the five bounding boxes associated with the particular track. As a non-limiting example, such an output may comprise a weighted combination of all (or one or more) determined boxes or otherwise regress a new box.

The trained model may then be implemented by a perception system on a vehicle, such as an autonomous vehicle. For example, the computing device may send the trained model to the vehicle to implement the trained model. The vehicle may traverse an environment and capture sensor data. The perception system on the vehicle may process the sensor data to generate multiple bounding boxes with various techniques. Further, the perception system may determine that the vehicle is traveling at around 35 miles per hour when the sensor data is captured. Accordingly, and by way of example, the perception system may use the trained model to output a bounding box that is appropriate for a situation of traveling at 35 miles per hour (e.g., a bounding box generated by a LIDAR-based technique). The output bounding box may be used to track an object and/or perform other operations to control the vehicle. Although one characteristic is discussed in this example (e.g., velocity), any number of characteristics may be used.

In many examples, a bounding box may represent a spatial location, orientation, and/or size (e.g., extents) of an object. For example, a bounding box may be a representation of an object defined by eight corners (e.g., a cuboid) and having a position, orientation, length, width, and/or height. In examples, a bounding box may be a minimum volume cuboid which encompasses an object. In some examples, a bounding box is a three-dimensional box, while in other examples a bounding box is a two-dimensional box. In some examples, the bounding box may comprise 6 degrees of freedom (e.g., x, y, z, yaw, pitch, roll). In examples, an orientation of a bounding box may include yaw, pitch, and/or roll. In examples, a bounding box may be generated by representing sensor data in a voxel space and determining a volume of space in the voxel space associated with voxels that have object identifiers. An object identifier may indicate that a voxel includes data that represents at least a portion of an object. In other examples, a bounding box may be generated in other manners.

The techniques discussed herein may accurately identify a bounding box to use for an object. For example, the techniques may train a model to select a type of bounding box and/or generate a new bounding box for a particular situation. The trained model may then be used to accurately output the most appropriate bounding box for a situation (e.g., output a bounding box that best represents an object). This may allow an object to be represented and/or tracked with greater accuracy, in comparison to previous techniques. When used in the context of an autonomous vehicle, this may ultimately increase the safety of passengers and/or individuals around the autonomous vehicle.

In examples, bounding boxes of objects in an environment may allow various systems of an autonomous vehicle performing segmentation, classification, route planning, trajectory generation, and the like to be performed more accurately, may require less processing resources, and/or may require less memory. For example, a bounding box for an object may be used instead of LIDAR points for the object, pixels of the object, or other data for the object that uses a larger amount of data.

FIG. 1 illustrates a pictorial flow diagram of an example process 100 for training a model and using the model to select a bounding box.

At operation 102, a computing device may receive data indicating one or more ground truth bounding boxes. In one example, the computing device may receive user annotated data indicating ground truth bounding boxes that have been designated by one or more users. Here, a user may view sensor data through a display on a client device and provide input to position a bounding box around an object to designate a ground truth bounding box (e.g., use a mouse, touch screen, or other device to draw a box, place a box and update a corner of the box, etc.). In some instances, the user or the computing device may designate an identifier for a ground truth bounding box, such as an identifier that identifies a type of object within the ground truth bounding box (e.g., a classification associated with the object), a unique identifier that identifies a specific object within the ground truth bounding box, etc. An object may include a vehicle, person, sign, road, structure (e.g., building), and/or any other object. In another example, the computing device may receive annotated data from an application, system, and/or other entity. In examples, annotated data may be received for various frames. Further, in examples annotated data may be received over time for various environments. Annotated data may be stored by the computing device in a data store and accessed at any time, such as to perform the operation 102.

Sensor data may include Light Detection and Ranging (LIDAR) data, RADAR data, depth sensor data (time of flight, structured light, etc.), image data (e.g., still images, video images, etc.), and/or any other form of data captured by a sensor. Further, in some examples, LIDAR data is collected over a period of a time, such as the time for revolution of a spinning LIDAR device, or collection of LIDAR devices, (also referred to as "meta spin"). In some examples, sensor data is captured by a vehicle, such as an autonomous vehicle, while the vehicle traverses an environment. In other examples, the sensor data is captured by other systems.

Example 104 illustrates sensor data 106 that may be displayed to a user and a ground truth bounding box 108 that may be designated by the user. In this example, the sensor data 106 comprises image data. In other examples, the sensor data 106 may comprise LIDAR data or other forms of data, such as points captured by a LIDAR sensor. Here, the sensor data 106 represents objects in an urban environment, such as cars, trucks, roads, buildings, bikes, pedestrians, etc. However, the sensor data 106 may represent any type of environment.

At operation 110, the computing device may train a machine learned model for a type(s) of bounding box(es). For example, the computing device may train the machine learned model to output a particular output bounding box when one or more inputs are input into the machine learned model. The training may be based on sensor data and/or data indicating one or more ground truth boxes for the sensor data. For instance, the computing device may process the sensor data with a perception system. The perception system may determine tracks for objects represented in the sensor data. The tracks may be determined over time as portions of the sensor data at different times (e.g., frames of the sensor data) are processed. The perception system may also implement any number of techniques to determine bounding boxes for objects represented in the sensor data. Example techniques are discussed in further detail below in reference to FIG. 3.

The perception system may associate each bounding box with a track. A track of an object may include a path traveled by the object. A track of an object may represent (or be based on) a current or previous position, velocity, acceleration, orientation, and/or heading of the object over a period of time (e.g., 5 seconds). In some examples, multiple bounding boxes may be determined, and a subset of which are associated with multiple tracks. For instance, it may be difficult to determine which track a box belongs to if tracks overlap, cross, or otherwise. In examples, different types of bounding boxes may be associated with a same track, such as bounding boxes generated by different techniques. As such, a single object represented by a track may be associated with multiple bounding boxes. In examples, a particular bounding box may be designated as a representative bounding box (e.g., a bounding box used for tracking).

The computing device may determine similarities between ground truth bounding boxes and tracks determined by the perception system. For example, the computing device may determine, for each track, a score between a ground truth bounding box and a respective track. A score may indicate how closely a ground truth bounding box matches a bounding box associated with an object track (e.g., a representative bounding box for the object track). In some examples, intersection over union (IOU) techniques may be used to determine a score. The computing device may identify an object track that is the most similar to a ground truth bounding box based on the scores. The computing device may map the ground truth bounding box to such object track.

The computing device may determine one or more characteristics associated with a situation in which sensor data was captured. The one or more characteristics may include a velocity of an object or a vehicle when the sensor data was captured, a distance from the vehicle to an object when the sensor data was captured, an amount of time a track has existed (e.g., 3 seconds, 1 minute, etc.), a proximity of the vehicle or the object to a road feature (e.g., intersection, parking lane, etc.) when the sensor data was captured, a geolocation of the vehicle, a confidence of a technique used to generate a bounding box, a ratio of empty space to occupied space within a bounding box associated with the sensor data, etc.

The computing device may then train a model to output a particular bounding box when the one or more characteristics are identified. For example, the computing device may compare a ground truth bounding box that is most similar to a track to each bounding box that is associated with a track (e.g., bounding boxes determined from various techniques). The computing device may select a bounding box for the track that is most similar to the ground truth bounding box. In examples, the computing device may use intersection over union (IOU) techniques to compare the ground truth bounding box to multiple bounding boxes associated with the track. The computing device may determine a type of the selected bounding box and train the model to select the type of bounding box when the one or more characteristic are identified. Here, the type of bounding box may represent the most accurate bounding box for the situation in which the sensor data was captured. A type of a bounding box may indicate a technique that was used to generate the bounding box. In one example, a bounding box generated from a top-down technique, described in detail below, is selected from a group of bounding boxes generated from various techniques including a top-down technique, a ground-based technique, blob-based or clustering technique, a region of interest-based technique, and a pose-based technique (each of which are discussed below in reference to FIG. 3).

In another example of training the model to output a particular bounding box when the one or more characteristics are identified, the computing device may train the model to generate a new bounding box. For instance, the computing device may train the model to generate, as an output bounding box, a combination of one or more bounding boxes determined with different techniques (e.g., an average of multiple bounding boxes, a weighted combination of multiple bounding boxes, etc.), a variation of a particular type of bounding box that is most similar to a ground truth bounding box (e.g., a bounding box that is larger than the particular type of bounding box by an amount or is otherwise scaled to the particular type of bounding box), etc.

Example 112 illustrates three bounding boxes that are associated with an object track 114 (e.g., three candidate bounding boxes). Further, one or more characteristics 116 are associated with a situation in which the sensor data 106 was generated. A machine learned model 118 may learn to output a bounding box for the one or more characteristics 116 based on the bounding boxes associated with the object track 114 and the ground truth bounding box 108.

At operation 120, the computing device may provide the machine learned model to a system. In one example, the computing device may send the machine learned model to a vehicle to implement the machine learned model within a system on the vehicle, such as a perception system. In another example, the computing device may be part of a vehicle and the computing device may send the machine learned model to a system on the vehicle. In yet other examples, the machine learned model may be sent to other systems, such as any system using machine vision. In examples, the machine learned model is provided over a network. Example 122 illustrates that the machine learned model 118 is provided to a system 124.

At operation 126, a system (e.g., the system 124) may receive sensor data from one or more sensors. The system may comprise a computing device on a vehicle and/or any other computing device. The system may be configured to implement the machine learned model that is trained at the operation 110. The sensor data may be captured by the one or more sensors while the system traverses an environment. Example 128 illustrates the sensor data 130 that is received from one or more sensors.

At operation 132, the system may determine a bounding box with the machine learned model. For example, the system may process the sensor data received at the operation 126 to generate multiple bounding boxes for objects represented in the sensor data. The bounding boxes may be generated with different techniques. The system may also determine one or more characteristics associated with a situation in which the sensor data was captured, such as a velocity of an object or a vehicle, a distance from the vehicle to an object, etc. The machine learned model may use the one or more characteristics to output a bounding box that is most appropriate for the one or more characteristics.

In one example, assume that the machine learned model is trained to select a bounding box generated with a top-down technique when an object is around 40 feet away from a vehicle and a vehicle is traveling at around 35 miles per hour. Here, if the vehicle is traveling at 34 miles per hour and the system identifies four potential bounding boxes (including a top-down bounding box) that are associated with a track for an object that is 42 feet away from the vehicle, the system may select the top-down bounding box for the track.

In another example, assume that the machine learned model is trained to output a combination of a bounding box generated by a top-down technique and a bounding box generated by a ground-based technique when an object is around 40 feet away from a vehicle and a vehicle is traveling at around 35 miles per hour. Here, if the vehicle is traveling at 34 miles per hour and the system identifies a top-down bounding box and a ground-based bounding box for an object that is 42 feet away from the vehicle, the system may combine the top-down bounding box and the ground-based bounding box to generate a new bounding box (e.g., an average of the two bounding boxes).

In some examples, multiple bounding boxes that are similar to a track (e.g., above a threshold, more than other tracks, etc.) may be associated with the track and a bounding box that is output at the operation 132 may be designated for object tracking. In other examples, a bounding box that is output at the operation 132 for a track may be associated with the track and other bounding boxes that are similar to the track may not be associated with the track (e.g., the machine learned model may be used to select a single bounding box to associate with a track).

Example 134 illustrates three bounding boxes 136 that are generated for the sensor data 130 using various techniques. The bounding boxes 136 may each map to a same track. That is, the bounding boxes 136 may be similar to a bounding box that is representative of the track. Here, the bounding boxes 136 may be input into the machine learned model 118 along with one or more characteristics 138 to output a bounding box 140. The one or more characteristics 138 may be associated with a situation in which the sensor data 130 was generated. In this example, the machine learned model 118 may output the bounding box 140.

At operation 142, the system may use the determined bounding box. For example, the system may update a track to designate a bounding box that is output at the operation 132 as the bounding box that is used for object tracking (also referred to as "state update" or "track update" for an object tracker). In examples, the determined bounding box may additionally, or alternatively, be used for other operations, such as generating a trajectory for a vehicle, detecting a potential collision with an object, avoiding a collision with an object, providing augmented reality (AR) content for an object, and so on. Example 144 illustrates using the bounding box 140 to track an object (a vehicle in this example).

Figure 2:
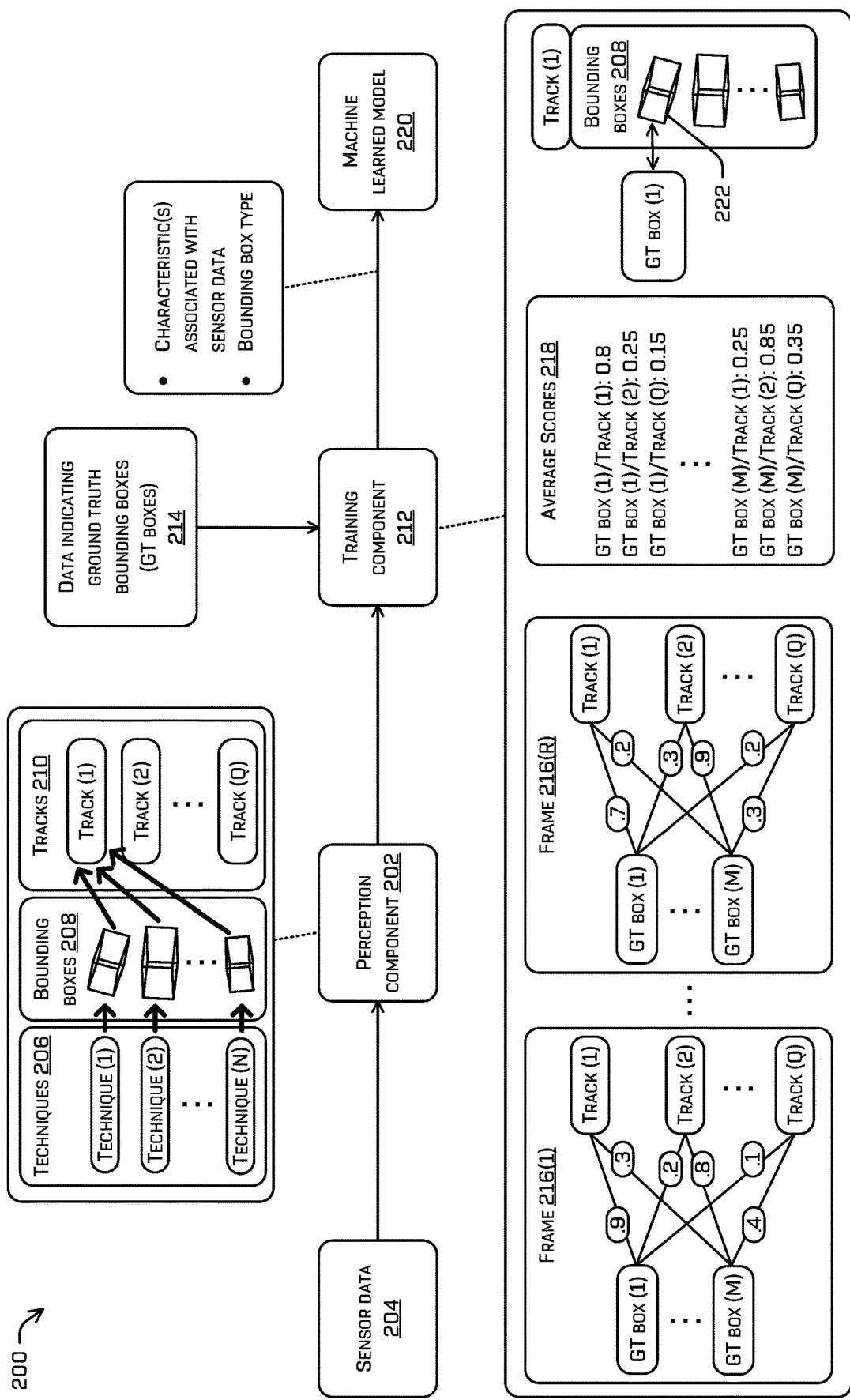
FIG. 2 illustrates a block diagram of an example system for training a model to output a bounding box.

FIG. 2 illustrates a block diagram of an example system 200 for training a model to output a bounding box.

The system 200 may include a perception component 202 that receives sensor data 204 from one or more sensors. In examples, the perception component 202 may process the sensor data 204 in a training mode to train a model, such as after a period of time has passed from capturing the sensor data 204. However, in other examples, the perception component 202 may process the sensor data 204 in real-time while the sensor data 204 is being captured.

The perception component 202 may implement techniques 206 (shown as techniques (1)-(N)) to determine bounding boxes 208 for objects represented in the sensor data 204. In particular, each of the techniques 206 may determine a bounding box for an object. Example techniques are discussed below in reference to FIG. 3. The perception component 202 may associate the bounding boxes 208 with tracks 210 (shown as tracks (1)-(Q) and sometimes referred to as "the tracks (1)-(Q)"). The tracks 210 may be generated while processing the sensor data 204 and/or may have been previously generated. For example, a track may be generated when a new object is detected within an environment. In the example of FIG. 2, the bounding boxes 208 are associated with the track (2), since each of the bounding boxes 208 is most similar to the track (2) from among the tracks 210. Examples of associating a bounding box with a track are discussed below in reference to FIG. 3. The perception component 202 may provide the tracks 210 and the associated bounding boxes 208 to a training component 212 to train a model.

The training component 212 may also receive, as input, data indicating ground truth bounding boxes 214 (shown as GT boxes (1)-(M) and sometimes referred to as "the ground truth bounding boxes (1)-(M)"). In this example, the data 214 indicates ground truth bounding boxes for the sensor data 204, which is divided into frames 216(1)-(R) (collectively "the frames 216"). Here, a user has viewed each of the frames 216 and provided ground truth bounding boxes for objects in each of the frames 216. Although frames are used in this example, it should be understood that the data 214 and/or the sensor data 204 may be represented in other formats, such as data otherwise divided based on capture times.

The training component 212 may determine similarity scores for the ground truth bounding boxes (1)-(M) and the tracks (1)-(Q). For example, as shown in FIG. 2, the training component 212 may compare the ground truth bounding box (1) and the track (1) in the frame 216(1) to determine a similarity score of "0.9". The comparison may be based on a size, orientation, and/or position of the ground truth bounding box (1) and the track (1) in the frame 216(1) (e.g., a bounding box designated as a representative bounding box for the track (1), such as the bounding box currently used for object tracking). In examples, the training component 212 may use intersection over union (IOU) techniques to determine an amount of overlap between a ground truth bounding box and a bounding box associated with a track. The amount of overlap may be represented with a similarity score (e.g., a number on a scale of 0 to 1, with 1 being an exact match). In other examples, other techniques may be used to determine the similarity score.

In a like manner, the training component 212 may determine a similarity score for each combination (also referred to as a pairing) of one of the ground truth bounding boxes (1)-(M) and one of the tracks (1)-(Q) in the frames 216. Each similarity score is illustrated on an edge (e.g., line) between one of the ground truth bounding boxes (1)-(M) and one of the tracks (1)-(Q). It should be understood that any of the tracks (1)-(Q) and/or the ground truth bounding boxes (1)-(M) may be removed and/or added over time as objects appear and disappear within sensor data.

In some examples, ground truth bounding boxes may include identifiers to enable the ground truth bounding boxes to be linked between frames. For instance, a first ground truth bounding box in a first frame and a second ground truth bounding box in a second frame may include a same unique identifier (e.g., which may be provided by a user or system). This may enable the training component 212 to recognize the first ground truth bounding box and the second ground truth bounding box as representing the same object.

In examples, the training component 212 may aggregate similarity scores. This may include calculating an average for a pairing, calculating a cumulative total for a pairing across frames, applying an algorithm, etc. In this example, the training component 212 calculates average scores 218 for the similarity scores across the frames 216. This may provide a more accurate manner of mapping a ground truth bounding box to a track. The training component 212 may then identify, for each of the ground truth bounding boxes (1)-(M), a pairing to a track that has a highest average similarity score. Here, the ground truth bounding box (1) has a highest similarity score with the track (1) and the ground truth bounding box (M) has a highest similarity score with the track (2).

In some examples, the training component 212 may use the Hungarian method (also referred to as the Munkres algorithm) and/or a slightly modified version thereof to account for temporal information (e.g., starting new tracks and or terminating when associations are no longer valid) to map (e.g., associate, assign, etc.) ground truth bounding boxes to tracks. For example, the training component 212 may aggregate similarity scores on a frame-by-frame basis and map ground truth bounding boxes to tracks while suppressing (for mapping) ground truth bounding boxes and/or tracks that have already been mapped. To illustrate, the training component 212 may aggregate a first score for a first frame and a second score for a second frame. Each of the first score and the second score may indicate a similarity for an association between a first ground truth bounding box and a first track. In this example, the training component 212 may use the Hungarian method and the aggregated score (which may be inverted by subtracting "1," in some examples) to map the first ground truth bounding box to the first track. Such mapping may occur at the second frame. Since the first ground truth bounding box has been mapped to the first track, the first ground truth bounding box and/or the first track may not be considered for mapping ground truth bounding boxes to tracks in further frames (e.g., frames after the second frame). In particular, when considering a third frame, the training component 212 may aggregate scores up to the third frame and use the Hungarian method to map ground truth bounding boxes to tracks. This may be done while refraining from considering the first ground truth bounding box and the first track. In other words, the first ground truth bounding box and the first track may be suppressed, so that they are not considered for a mapping to another track or ground truth bounding box, since they have already been mapped to each other.

The training component 212 may determine one or more characteristics associated with a situation in which the sensor data 204 was captured. The one or more characteristics may include a velocity of an object or a vehicle when the sensor data 204 was captured, a distance from the vehicle to an object when the sensor data 204 was captured, an amount of time a track has existed when the sensor data 204 was captured (e.g., 3 seconds, 1 minute, etc.), a proximity of the vehicle or the object to a road feature (e.g., intersection, parking lane, etc.) when the sensor data 204 was captured, a geolocation of the vehicle when the sensor data 204 was captured, a confidence associated with a technique used to generate a bounding box (e.g., one or more of the bounding boxes 206), an amount of empty space or occupied space within a bounding box (e.g., a ratio of empty space to occupied space), features from a layer in a neural network that is implemented for a technique used to generate a bounding box (e.g., features of an intermediate layer), etc. In examples, a confidence associated with a technique used to generate a bounding box may include a general confidence (e.g., this technique is generally 90% accurate in generating a bounding box that matches an object), a specific confidence (e.g., in this instance, an 81% accuracy is estimated for generating a bonding box for an object using a technique), a classification confidence for a technique used to generate a bounding box, etc. In examples, a technique used to generate a bounding box may output a confidence for such technique.

The training component 212 may train a machine learned model 220 based on the one or more characteristics, the data 214, and/or the bounding boxes 208. For example, the training component 212 may train the machine learned model 220 to output a particular bounding box when a velocity of an object or a vehicle is at a rate, above/below a threshold rate, and/or within a range (e.g., at 25 miles per hour, between 25-30 miles per hour, above 50 miles per hour, etc.); a distance from a vehicle to an object is at a distance, above/below a threshold distance, and/or within a range (e.g., at 60 feet, between 100 and 120 feet, below 30 feet, etc.); an amount of time a track has existed is at a particular amount of time, above/below a threshold amount of time, and/or within a range (e.g., at 3 seconds, between 5 and 60 seconds, above 1 minute, etc.); a proximity of a vehicle or the object to a road feature is a distance, above/below a threshold distance, and/or within a range (e.g., an intersection, parking lane, etc. is less/more than a threshold distance away); an amount of empty space or occupied space within a bounding box is at a particular amount, above/below a threshold, and/or within a range (e.g., a number of voxels that are occupied with data for the bounding box 220 is more than 85% of the entire number of voxels that make up the bounding box 220); a geolocation of the vehicle is within a particular region; a confidence associated with a technique used to generate a bounding box is at a particular value, above a threshold value, or below a threshold value; etc. As such, the training component 212 may train the machine learned model 220 to output a particular bounding box when one or more characteristics are identified.

In one example, the training component 212 may compare the ground truth bounding box (1) (which is most similar to the track (1)) to each of the bounding boxes 208 that are associated with the track (1) (e.g., bounding boxes determined from various techniques). The comparison may be based on a size, orientation, and/or position of the ground truth bounding box (1) and each of the bounding boxes 208. In examples, the training component 212 may use intersection over union (IOU) techniques. The training component 212 may then determine that a bounding box 222 of the bounding boxes 208 is most similar to the ground truth bounding box (1). The training component 212 may then determine a bounding box type of the bounding box 222 (e.g., indicating a technique used to generate the bounding box 222). The training component 212 may select or designate the bounding box type as the most appropriate (e.g., most accurate for representing an object) for the situation in which the sensor data 204 was captured. The training component 212 may train the machine learned model 220 to select the bounding box type when one or more characteristics are identified. Although training is discussed with respect to one bounding box type in many examples, similar processing may occur for various bounding box types.

In another example, the training component 212 may calculate an average of the bounding boxes 208 (e.g., an average size, shape, position, orientation, etc.) and/or otherwise regress a "best" box based on the input boxes, including the associated ground truth box. The training component 212 may compare the ground truth bounding box (1) to the average of the bounding boxes 208 and determine that the average of the bounding boxes 208 is within a threshold amount of similarity to the ground truth bounding box (1). The training component 212 may then train the machine learned model 220 to output an average of bounding boxes when one or more characteristics are identified.

Figure 3:
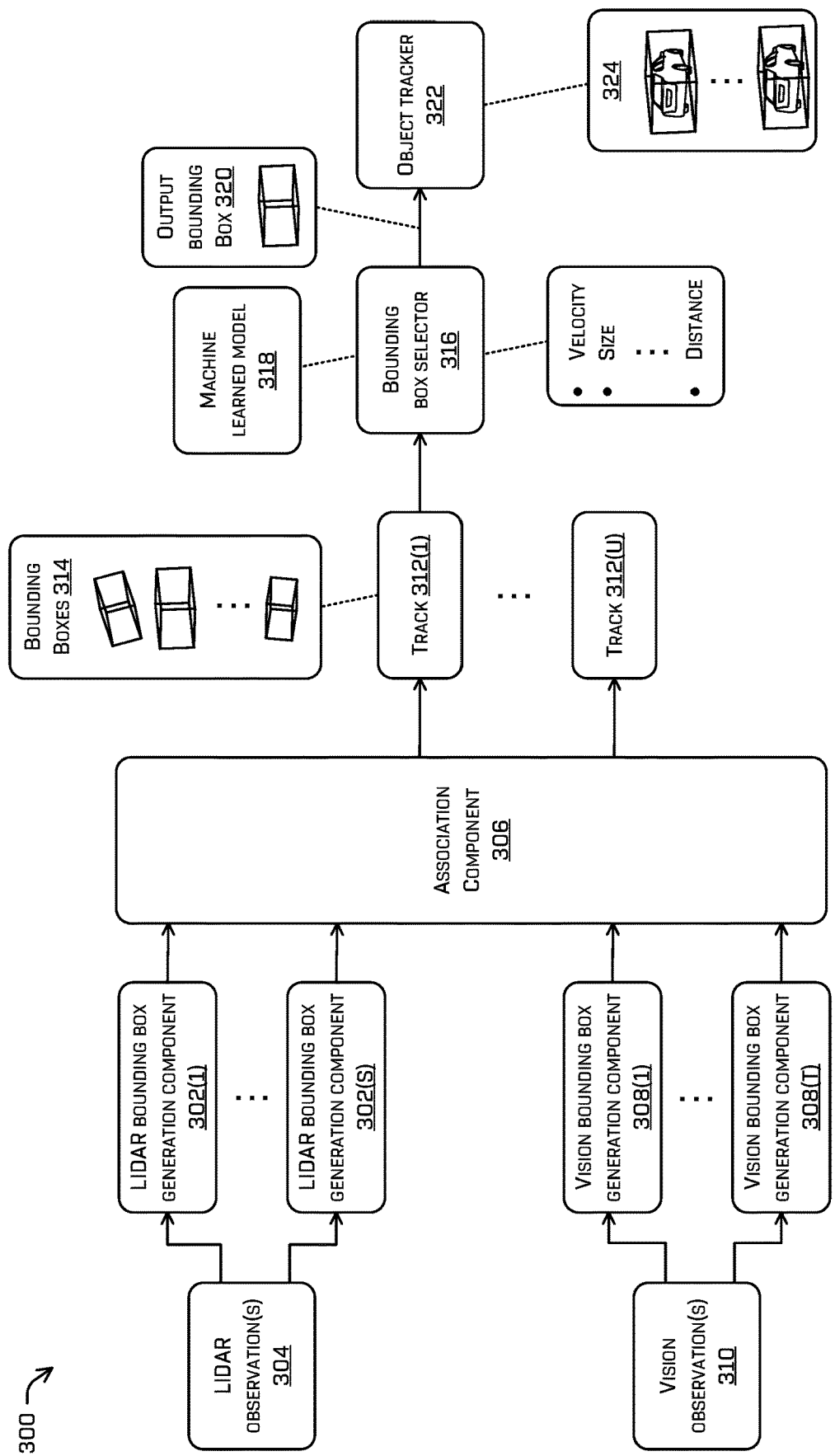
FIG. 3 illustrates a block diagram of an example system for implementing a trained model to output a bounding box.

FIG. 3 illustrates a block diagram of an example system 300 for implementing a trained model to output a bounding box.

The system 300 may include LIDAR bounding box generation components 302(1)-(S) that receive a LIDAR observation(s) 304. The LIDAR observation(s) 304 may comprise LIDAR data or data generated by processing LIDAR data. The LIDAR bounding box generation components 302 may implement various techniques to generate bounding boxes for the LIDAR observation(s) 304. For example, each of the LIDAR bounding box generation components 302 may implement a different technique to generate a different type of bounding box. The LIDAR bounding box generation components 302 may provide any bounding boxes that are generated to an association component 306.

In examples, one of the LIDAR bounding box generation components 302 may implement a top-down technique to generate a bounding box. The top-down technique may include performing segmentation on three-dimensional data represented in a volume element ("voxel") space to determine objects in an environment. For example, the top-down technique may include, but are not limited to, associating the LIDAR observation(s) 304 with a voxel space, viewing the LIDAR observation(s) 304 from a "top-down perspective," and using a machine-learning algorithm to output masks associated with the one or more objects. Such algorithms may be trained to output masks representing a region smaller than the detected one or more objects so that, in an inference mode, a size of the masks may be increased until a threshold is reached, where the threshold may be represented by a fixed value margin or a percentage of the mask, or until the mask intersects another mask representing another vehicle and/or object. The voxels within the masks may be associated with one or more object identifiers and the data associated with the masks may be segmented. The segmented data may be passed to other classifiers to classify the one or more objects and/or to a planning system to determine a trajectory of the vehicle.

In some examples, the top-down technique may include generating, based at least in part on the LIDAR observation(s) 304, a bounding box associated with at least one object. For example, the bounding box may represent an extent (e.g., length, width, and/or height) of the object represented in the LIDAR observation(s) 304. In some instances, the top-down technique may include associating at least a portion of the LIDAR observation(s) 304 with a voxel space. In some instances, a voxel of the voxel space may include any number of features representing the LIDAR observation(s) 304. For example, features of a voxel may include, but are not limited to, as mean or average three-dimensional coordinate values of the LIDAR observation(s) 304 associated with the voxel, one or more covariance matrices associate one or more degrees of freedom of data (e.g., x-direction, y-direction, z-direction, etc.) semantic segmentation probabilities (e.g., a probability that one or more LIDAR data points represents one or more objects, including but not limited to, vehicles, animals, pedestrians, buildings, and the like), an indication of occupancy of the voxel, ray casting information, a free space indication, background subtraction information, and the like. Further, the top-down technique may include generating, as training data and based at least in part on the bounding box, a mask representing a region that is smaller than a region associated with at least one object. The mask may be associated with a top-down perspective of the voxel space. For example, the mask may represent a representation which is smaller than a ground truth bounding box of the object represented in the voxel space. In some examples, a length and width of a bounding box may be based at least in part on a mask, while in some cases a height of a bounding box may be determined based on height of voxels associated with the object, learned parameters, and the like.

In one example, the top-down technique may include a technique discussed in U.S. patent application Ser. No. 15/963,833, filed Apr. 26, 2018 and entitled "Data Segmentation Using Masks," the entire contents of which are incorporated herein by reference.

In examples, one of the LIDAR bounding box generation components 302 may implement a ground-based technique to generate a bounding box. The ground-based technique may represent the LIDAR observation(s) 304 in a voxel space as raw sensor data (e.g., with individual <x, y, z, range, time, etc.> values associated with data points) or may be represented as a statistical accumulation of data. For example, LIDAR data may be accumulated in the voxel space, with an individual voxel including processed data, such as a number of data points, an average intensity, average x-value of LIDAR data associated with the individual voxel; average-y value of the LIDAR data associated with the individual voxel; average z-value of the LIDAR data associated with the individual voxel; and/or a covariance matrix based on the LIDAR data associated with the voxel.

With the LIDAR data represented in the voxel space, the ground-based technique may include determining voxels that are associated with a ground plane (e.g., a drivable surface for an autonomous vehicle), which may include determining locally flat voxels. In some instances, determining a locally flat voxel may include fitting a surface to the data in a voxel (e.g., either the individual LIDAR data points and/or performing a calculation on the covariance matrix (e.g., an Eigenvalue decomposition or principle component analysis)), determining a normal vector of the surface, and determining if the normal vector is within a threshold direction of a reference direction, which may correspond to an orientation of an autonomous vehicle. In some instances, determining a locally flat voxel may include a marching cubes-type algorithm which includes creating a mesh in the voxel space, determining that the mesh occupies at least a portion of a voxel, determining a surface normal vector of the mesh associated with the voxel, and determining if the surface normal is within a threshold direction of a reference direction. After locally flat voxels are determined, clustering techniques such as region growing may be used to identify ground voxels or a ground plane representing a flat or drivable surface. Further, as there may be gaps in the data resulting in multiple patches or clusters in the voxel space, the processing may include interpolating between various points in voxels in adjacent clusters to determine if an adjacent cluster should be included as the ground plane. After identifying the ground plane, the ground plane may be removed or set aside from the voxel space, and operations may be performed on the remaining data.

Clustering techniques such as region growing may be applied to the remaining voxels to determine objects represented in the voxel space. Individual objects may be identified by grouping adjacent voxels, with each object being associated with a unique object identifier. As a non-limiting example, all LIDAR points associated with a single object may all have the same object identifier, whereas LIDAR points associated with different objects may have different object identifiers. In some instances, an object identifier may be associated with a voxel and/or propagated to the LIDAR data. As LIDAR data is captured or received over time, an occupancy of a voxel may be evaluated to distinguish between static objects and dynamic objects. For example, ray casting may be used to distinguish between objects closely related in space, such as a person walking close to a background object such as a wall, to distinguish between static objects and dynamic objects. Further, ray casting may be used to determine when voxels that were occupied at a first time are unoccupied at a second, subsequent time, and vice versa, which may indicate movement of an object. Ray casting techniques may also be used to clear a map or increase resolution of objects as data is accumulated over time. Objects that are dynamic objects may further be tagged or associated with a dynamic object identifier.

When objects are identified, the ground-based technique may process a list of static and/or dynamic objects and/or data for those objects to generate a bounding box that defines a boundary of each individual object. In some instances, a bounding box may be generated by determining a volume of space in the voxel space associated with voxels associated with an object identifier.

In one example, the ground-based technique may include a technique discussed in U.S. patent application Ser. No. 15/622,905, filed Jun. 14, 2017 and entitled "Voxel Based Ground Plane Estimation and Object Segmentation," the entire contents of which are incorporated herein by reference.

In examples, one of the LIDAR bounding box generation components 302 may implement a blob-based or clustering technique to generate a bounding box.

The system 300 may also include vision bounding box generation components 308(1)-(T) that receive a vision observation(s) 310 (also referred to as vision data). The vision observation(s) 310 may comprise sensor data and/or data generated by processing the sensor data. For example, sensor data may be subjected to computer/machine vision processing to generate observations regarding the sensor data. The vision bounding box generation components 308 may implement various techniques to generate bounding boxes for the vision observation(s) 310. For example, each of the vision bounding box generation components 308 may implement a different technique to generate a different type of bounding box. The vision bounding box generation components 308 may provide any bounding boxes that are generated to the association component 306.

In examples, one of the vision bounding box generation components 308 may implement a region of interest-based technique to generate a bounding box. The region of interest-based technique may include determining a region of interest for sensor data (e.g., the vision observation(s) 310), determining data of the sensor data that corresponds to the region of interest (e.g., falls within the region of interest), sorting sensor data by distance, identifying an object that is associated with a median distance, and generating a bounding box for the object. For example, the region of interest-based technique may determine a distance to an object in an environment using image data from an image sensor and LIDAR data from a LIDAR sensor. In some examples, the region of interest-based technique may determine a distance from a camera to an object (e.g., a depth of the object) based at least in part on receiving an indication of pixels that correspond to the object in the image (termed a "region of interest"); receiving LIDAR data; and determining LIDAR points from the LIDAR data that correspond to the region of interest and a time the image was taken. Once these LIDAR points have been identified, the region of interest-based technique may include scoring the LIDAR points and using the scores associated with the LIDAR points as weights in a weighted median calculation, sorting the LIDAR points by distance (e.g., each LIDAR point may be associated with a distance measurement and, in some examples, an angle as well), and determining a weighted median of the sorted LIDAR points using the scores as the weights. In some examples, the region of interest-based technique may include identifying the weighted median as a depth estimate to associate with the object. In examples, the region of interest-based technique may generate a bounding box for an object. In some examples, the region of interest-based technique may be based on image data and LIDAR data that have been combined.

In one example, the region of interest-based technique may include a technique discussed in U.S. patent application Ser. No. 15/970,838, filed May 3, 2018 and entitled "Associating LIDAR Data and Image Data," the entire contents of which are incorporated herein by reference.

In examples, one of the vision bounding box generation components 308 may implement a pose-based technique to generate a bounding box. The pose-based technique may include determining an object position and/or orientation (e.g., a bounding box) based on image data and object contact points. For example, the pose-based technique may detect an object, such as another vehicle, represented in image data, and may provide the image data to an object contact point component that may identify contact points of the vehicle and the surface within the image data. For instance, the object contact point component may include a machine learning algorithm trained to detect contact points between wheels of a vehicle and the ground. For an individual vehicle contact point (e.g., a left-front wheel or tire of the vehicle), a ray may be determined that originates from an endpoint (e.g., an origin) associated with the image sensor and passes through the object contact point. To determine a depth (e.g., distance) between the image sensor and the object contact point, the ray may be unprojected onto a three-dimensional surface mesh, and an intersection point between the ray and the three-dimensional surface mesh may be used as an initial estimate for the projected location of the object contact point. The projected location may be adjusted based on various cost functions to optimize an accuracy of the locations of the projected object contact points. With the object contact points projected onto the three-dimensional surface mesh, a three-dimensional bounding box may be determined that represents various observations about the vehicle. For example, the observations may include, but are not limited to, orientation, length, width, velocity, and the like.

In one example, the pose-based technique may include a technique discussed in U.S. patent application Ser. No. 15/814,870, filed Nov. 16, 2017 and entitled "Pose Determination from Contact Points," the entire contents of which are incorporated herein by reference.

The LIDAR bounding box generation components 302 and/or the vision bounding box generation components 308 may generate any number of bounding boxes and provide such bounding boxes to the association component 306.

The association component 306 may associate the bounding boxes generated by the LIDAR bounding box generation components 302 and/or the vision bounding box generation components 308 with tracks 312(1)-(U). The tracks 312 may be generated over time by a perception system as sensor data is received. Additionally, or alternatively, the association component 306 may associate sensor data representing an object with the tracks 312. For example, the association component 306 may associate a track with a bounding box and LIDAR data for an object (e.g., a group of points within the bounding box). Each of the tracks 312 may comprise a historical position, historical velocity, historical acceleration, historical extents, and/or historical orientation for an object.

To make an association, the association component 306 may compare a detected object (e.g., a bounding box and/or associated sensor data) to the tracks 312. The comparison may be based on a size, orientation, velocity, and/or position of a detected object and a track. That is, the association component 306 may compare a size/orientation/velocity/extent/position of a newly generated bounding box to a size/orientation/velocity/extent/position of a bounding box already associated with the track, such as a bounding box designated as a representative bounding box for object tracking. For example, the association component 306 may determine whether a detected object (e.g., bounding box for the object) is within a threshold distance of a previous position of the object associated with a track, whether the detect object has a threshold amount of velocity to a previous velocity of the object associated with the track, whether the detected object has a threshold amount of similarity in orientation to a previous orientation of the object associated with the track, etc. In examples, the association component 306 may use intersection over union (IOU) techniques to compare bounding boxes.

In some instances, multiple bounding boxes may be associated with a same track. For instance, a bounding box generated with the LIDAR bounding box generation component 302(1), a bounding box generated with the LIDAR bounding box generation component 302(S), a bounding box generated with the vision bounding box generation component 308(1), and a bounding box generated with the vision bounding box generation component 308(T) may each be associated with the track 312(1). Here, each of the bounding boxes attempts to represent the same object. In the example of FIG. 3, the track 312(1) is associated with bounding boxes 314 generated with different techniques.

The system 200 may also include a bounding box selector 316 that implements a machine learned model 318 to output a bounding box for a situation. In the example of FIG. 3, the bounding box selector 316 outputs a bounding box for the track 312(1) and/or a covariance for the output bounding box. Similar processes may be performed for other tracks. For example, the bounding box selector 314 may determine one or more characteristics associated with the LIDAR observation(s) 304 and/or the vision observation(s) 310 (e.g., characteristics associated with current sensor data). The one or more characteristics may comprise a velocity of a detected object, a velocity of a vehicle, a distance from the vehicle to the detected object, a number of frames associated with the track 312(1), a proximity (e.g., distance) of the vehicle or the detected object to a road feature, a geolocation, a confidence of a technique, an amount of empty space within a bounding box, an amount of occupied space within a bounding box, etc. In this example, the bounding box selector 316 may update the track 312(1) with an output bounding box 320 and/or send an indication of the output bounding box 320 to the object tracker 322.

The object tracker 322 may use the output bounding box 320 and/or the track 312(1) to track an object. For example, the object tracker 322 may update a designated bounding box that is used for tracking to the output bounding box 320 (e.g., update a state of the object tracker 322 for the track 312(1)). In some instances, the object tracker 322 may smooth a transition from a previously designated bounding box to a newly designated bounding box (e.g., so that an object track is smooth, which may more accurately reflect how an object actually traveled). In examples, the object tracker 322 may implement a Kalman and/or Extended Kalman filter (EKF) to smooth a transition. In particular, a Kalman or Extended Kalman filter (EKF) may process a previously designated bounding box and a newly designated bounding box to determine a smoothed bounding box. The smoothed bounding box may have a size, position, orientation, etc. that is different than the selected bounding box 318. The smoothed bounding box may be used to update the track 312(1). That is, the smoothed bounding box may be designated as the bounding box that is used for the track 312(1) (e.g., for object tracking). This may help to smooth transitions that would otherwise be relatively abrupt and/or help to account for noisy bounding boxes. In the example of FIG. 3, a representation 324 shows an example of the object tracker 322 tracking an object over time.

In one example of outputting the most appropriate bounding box for a situation, assume that the machine learned model 318 is trained to select a bounding box generated with a pose-based technique when a vehicle is traveling 30-45 miles per hour and the vehicle is within 50 feet to an object. The machine learned model 318 may be trained to do so based on identifying (e.g., more than a threshold number of times) a pose-based bounding box type as the most appropriate for such situation. Also, assume that multiple bounding boxes are generated and associated with the track 312(1), which may represent a person. In this example, the bounding box selector 316 may determine that a current velocity of the vehicle 34 miles per hour and that the vehicle is currently 42 feet from the person. As such, the bounding box selector 316 may select a bounding box generated with a pose-based technique and send the selected bounding box to the object tracker 322. The object tracker 322 may use the selected bounding box to update a bounding box designated for object tracking for the track 312(1) (e.g., generate a smoothed bounding box to update a state of the object tracker 322 for the track 312(1)).

Although the object tracker 322 is illustrated in FIG. 3, other components may additionally, or alternatively, be implemented. For example, a localization component, a planning component, and/or any other component may receive data regarding an update to a track.

Figure 4A:
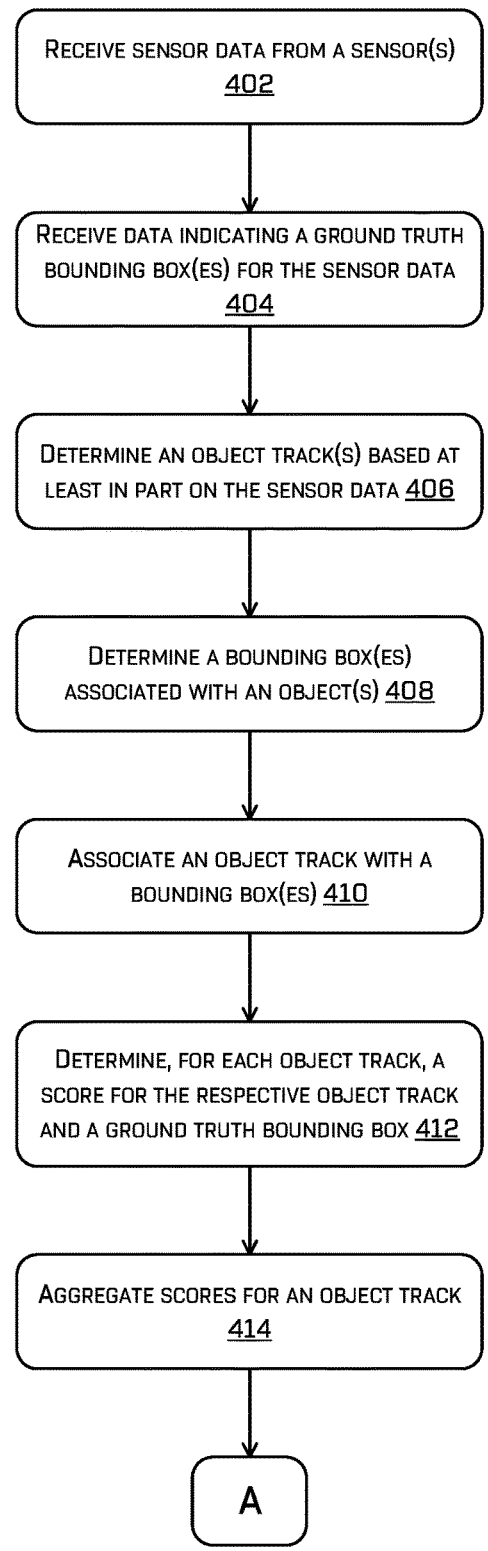
FIGS. 4A-4B illustrates an example process to train a machine learned model for outputting a bounding box.
Figure 4B:
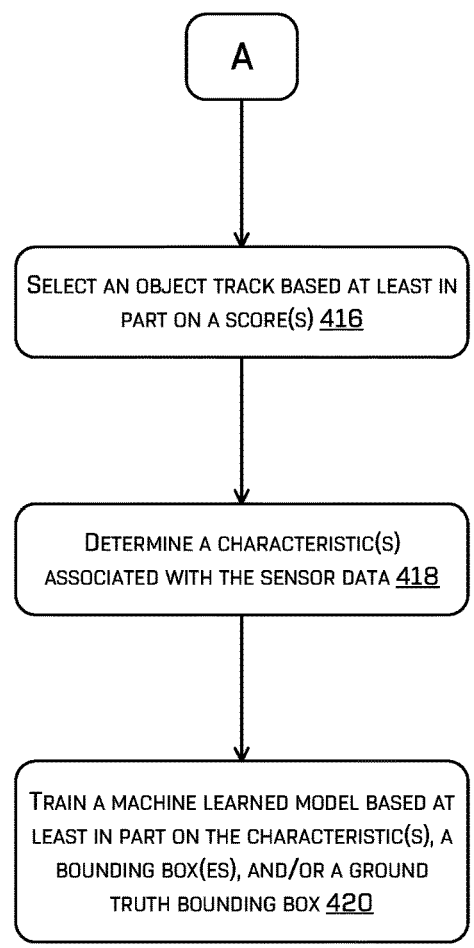
Figure 5:
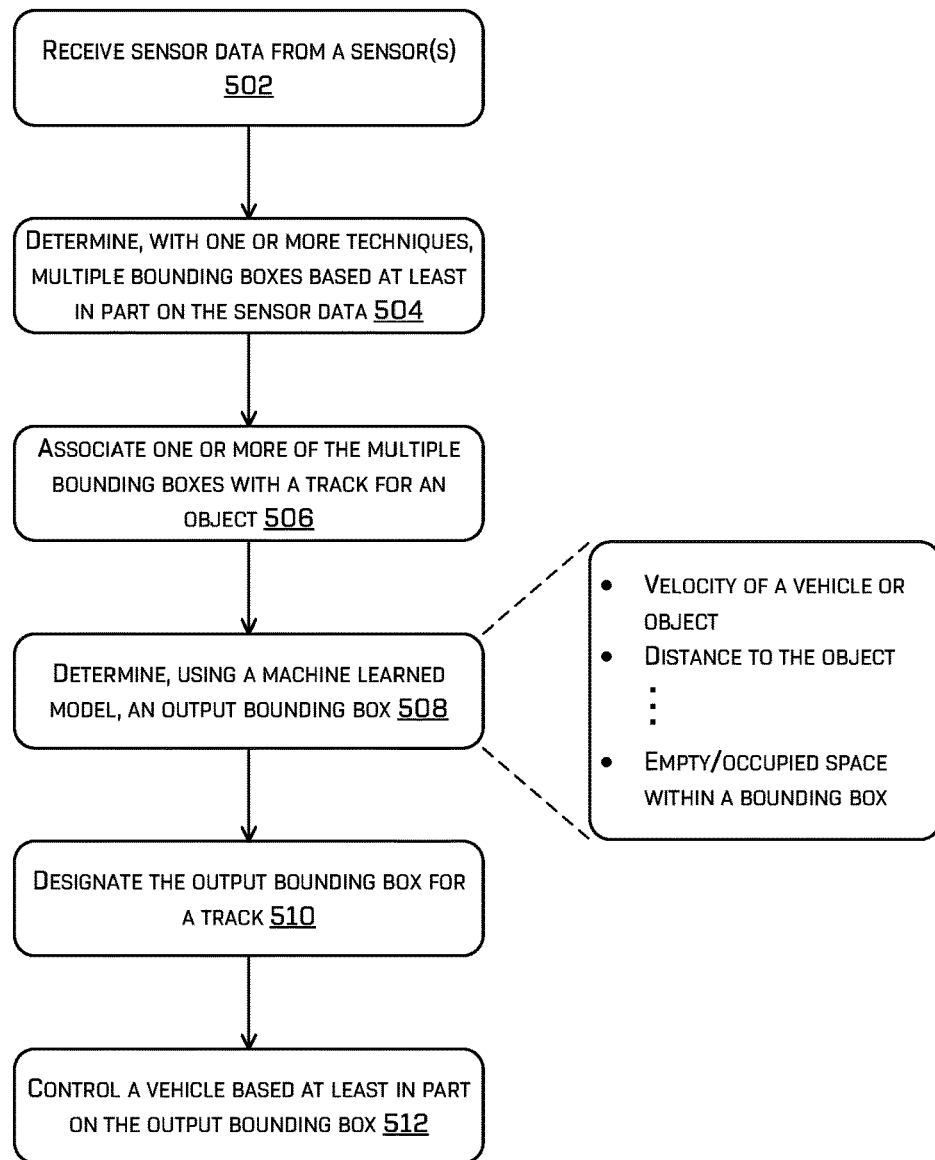
FIG. 5 illustrates an example process to output a bounding box for a track using a machine learned model.

FIGS. 4A, 4B, and 5 illustrate example processes 400 and 500 to perform the techniques discussed herein. The processes 400 and 500 are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. The processes 400 and/or 500 may be performed by any device or component.

FIGS. 4A-4B illustrates the example process 400 to train a machine learned model for outputting a bounding box.

In FIG. 4A, at operation 402, a system may receive sensor data from one or more sensors. The sensor data may include Light Detection and Ranging (LIDAR) data, radio detection and ranging (RADAR) data, depth sensor data (time of flight, structured light, etc.), image data (e.g., still images, video images, etc.), and/or any other form of data captured by a sensor. The system may be implemented on a vehicle, a computing device, etc.

At operation 404, the system may receive data indicating one or more ground truth bounding boxes for the sensor data. For example, the system may receive user annotated data indicating one or more ground truth bounding boxes for objects represented in the sensor data.

At operation 406, the system may determine one or more object tracks based at least in part on the sensor data. For example, the system may determine a first object track for a first object and a second object track for a second object.

At operation 408, the system may determine one or more bounding boxes associated with one or more objects. This may include implementing multiple techniques based on the sensor data to generate multiple bounding boxes.

At operation 410, the system may associate an object track with a bounding box(es).

At operation 412, the system may determine, for each object track, a score for the respective object track and a ground truth bounding box. For example, the system may determine a first score for an association between a first object track and a ground truth bounding box. The first score may indicate how closely the ground truth bounding box matches the first object track. The system may also determine a second score for an association between a second object track and the ground truth bounding box. The second score may indicate how closely the ground truth bounding box matches the second object track.

At operation 414, the system may aggregate scores for an object track over a number of frames. For example, if the sensor data and/or the ground truth bounding boxes are associated with multiple frames, the system may receive ground truth bounding boxes for the multiple frames and determine a score for each pairing of a ground truth bounding box and an object track across the multiple frames. The system may then aggregate scores for each of the pairings across the multiple frames. Scores for any number of frames may be aggregated, such as a particular number of frames, all frames where a pairing exists, frames over a particular period of time, etc.

In some examples, the system may aggregate scores for a first frame and a second frame for a pairing of a ground truth bounding box and an object track. The system may then map, using a Hungarian method, for the second frame, and based on the aggregated score, the ground truth bounding box with the object track. The system may receive sensor data associated with a third frame. The system may also receive data indicating the ground truth bounding box for an object in the third frame and indicating another ground truth bounding box for another object in the third frame. The system may map, using the Hungarian method and for the third frame, the other ground truth bounding box with the other object track while refraining from considering the ground truth bounding box for the object in the third frame and the object track.

In FIG. 4B, at operation 416, the system may select an object track based at least part on a score(s). For example, the system may select, for a first ground truth bounding box, a particular object track if a score between the particular object track and the first ground truth bounding box is higher than a score between another object track and the first ground truth bounding box.

At operation 418, the system may determine one or more characteristics associated with the sensor data. The one or more characteristics may include a velocity of the object, a velocity of the system (e.g., a vehicle associated with the system), a distance to the object, a number of frames associated with the track (e.g., a number of frames in which the object appears), a proximity of the system or the object to a road feature, a size of the object, an amount of empty/occupied space within a bounding box (e.g., a number of voxels for the bounding box that include data, a number of empty voxels, etc.), a geolocation, a confidence associated with a technique used to determine a bounding box, etc.

At operation 420, the system may train a machine learned model based at least in part on the one or more characteristics, one or more bounding boxes associated with an object track (e.g., the selected object track), and/or a ground truth bounding box (e.g., mapped to the selected object track). For example, the system may provide the one or more characteristics, one or more bounding boxes associated with the object track, and/or the ground truth bounding box to the machine learned model to train the machine learned model to output a particular bounding box. In one example, the training includes training the machine learned model to output, as an output bounding box, a type of bounding box from among a plurality of types of bounding boxes. In another example, the training includes training the machine learned model to determine an output bounding box (e.g., generate a new bounding box).

FIG. 5 illustrates the example process 500 to output a bounding box for a track using a machine learned model.

At operation 502, a system may receive sensor data from one or more sensors. In examples, the system may be implemented on a vehicle, such as an autonomous vehicle.

At operation 504, the system may determine, with one or more techniques, multiple bounding boxes based at least in part on the sensor data. For example, the system may determine or generate, based on the sensor data, a first bounding box with a first technique and determine or generate, based on the sensor data, a second bounding box with a second technique. A technique used to determine or generate a bounding box may indicate a type of the bounding box.

At operation 506, the system may associate one or more of the multiple bounding boxes with a track for an object. For example, the system may compare a bounding box to a bounding box associated with a track. The comparison may be based on a size, orientation, velocity, and/or position of a bounding box. In one example, if a bounding box has more than a threshold amount of similarity to a track, the system may associate the bounding box with the track. In another example, if a bounding box has the most similarity to a particular track from among multiple tracks, the system may associate the particular bounding box with the particular track.

At 508, the system may determine, using a machine learned model, an output bounding box. In examples, this may include inputting characteristic data (e.g., for the sensor data) and/or bounding boxes that are associated with a track into the machine learned model and receiving the output bounding box from the machine learned model. In some examples, the output bounding box may be one of the bounding boxes that is associated with the track (e.g., a particular type of bounding box that is appropriate for the characteristic data). In other examples, the output bounding box may be a bounding box that is determined by the machine learned model based on one or more of the bounding boxes that are associated with the track (e.g., a bounding box that is generated by the machine learned model). Characteristic data may indicate a velocity of the object, a velocity of the system (e.g., a vehicle associated with the system), a distance to the object, a number of frames associated with the track (e.g., a number of frames in which the object appears), a proximity of the system or the object to a road feature, a size of the object, an amount of empty/occupied space within a bounding box (e.g., a number of voxels for the bounding box that include data, a number of empty voxels, etc.), a geolocation of the vehicle, a confidence associated with a technique used to determine the bounding box, and so on.

At operation 510, the system may designate the output bounding box for a track. For example, the track may be updated to designate (e.g., associate) the output bounding box as the representative bounding box for the track.

At operation 512, the system may control a vehicle based at least in part on the output bounding box. In one example, the system may track the object using a Kalman and/or Extended Kalman filter (EKF) based at least in part on the output bounding box. In another example, the system may generate a trajectory for a vehicle based at least in part on the output bounding box.

Figure 6:
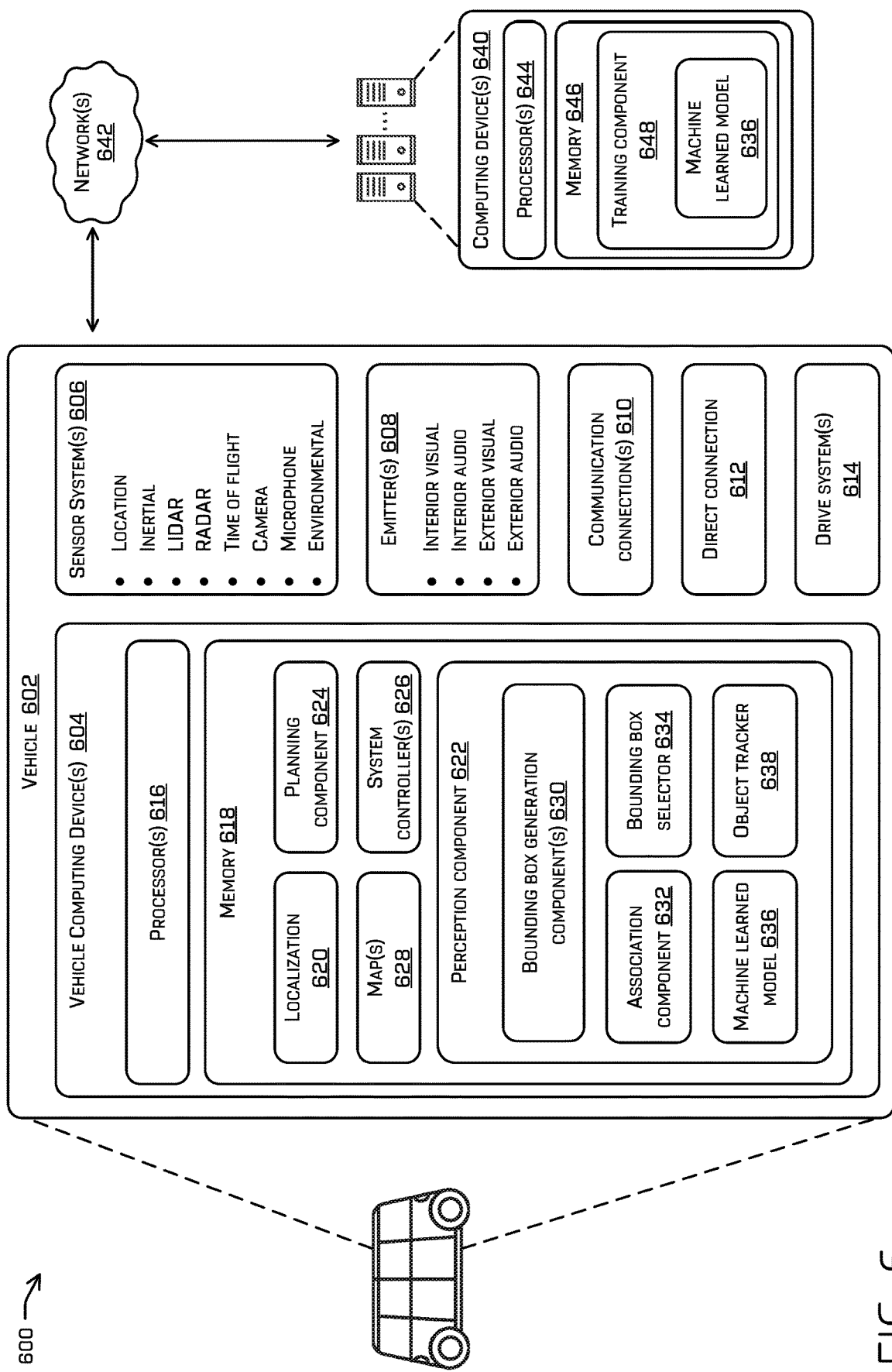
FIG. 6 depicts a block diagram of an example system for implementing the techniques described herein.

FIG. 6 depicts a block diagram of an example system 600 for implementing the techniques described herein. In at least one example, the system 600 may include a vehicle 602.

The vehicle 602 may include a vehicle computing device 604, one or more sensor systems 606, one or more emitters 608, one or more communication connections 610, at least one direct connection 612, and one or more drive systems 614.

The vehicle computing device 604 may include one or more processors 616 and memory 618 communicatively coupled with the one or more processors 616. In the illustrated example, the vehicle 602 is an autonomous vehicle; however, the vehicle 602 could be any other type of vehicle. In the illustrated example, the memory 618 of the vehicle computing device 604 stores a localization component 620, a perception component 622, a planning component 624, one or more system controllers 626, and one or more maps 628. Though depicted in FIG. 6 as residing in memory 618 for illustrative purposes, it is contemplated that the localization component 620, the perception component 622, the planning component 624, the one or more system controllers 626, and the one or more maps 628 may additionally, or alternatively, be accessible to the vehicle 602 (e.g., stored remotely).

In at least one example, the localization component 620 may include functionality to receive data from the sensor system(s) 606 to determine a position of the vehicle 602. For example, the localization component 620 may include and/or request/receive a three-dimensional map of an environment and may continuously determine a location of the autonomous vehicle within the map. In some instances, the localization component 620 may utilize SLAM (simultaneous localization and mapping) or CLAMS (calibration, localization and mapping, simultaneously) to receive image data, LIDAR data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for generating a candidate trajectory.

In some instances, the perception component 622 may include functionality to perform object detection, segmentation, and/or classification. In some examples, the perception component 622 may provide processed sensor data that indicates a presence of an entity that is proximate to the vehicle 602 and/or a classification of the entity as an entity type (e.g., car, pedestrian, cyclist, building, tree, road surface, curb, sidewalk, unknown, road feature, etc.). In examples, the perception component 622 may process sensor data to identify a road feature (e.g., an intersection, parking lane, signal light, stop sign, etc.), determine a proximity of the road feature to the vehicle 602, and/or provide data regarding the road feature (e.g., proximity, etc.) as processed sensor data. In additional and/or alternative examples, the perception component 622 may provide processed sensor data that indicates one or more characteristics associated with a detected entity and/or the environment in which the entity is positioned. In some examples, characteristics associated with an entity may include, but are not limited to, an x-position, a y-position, a z-position, an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In examples, the perception component 622 (sometimes referred to as a perception system) may include a bounding box generation component(s) 630 to generate bounding boxes using various techniques (e.g., a LIDAR-based technique, a vision-based technique, etc.). In examples, the bounding box generation component(s) 630 may correspond to any of the LIDAR bounding box generation components 302 and/or the vision bounding box generation components 308 of FIG. 3. The perception component 622 may also include an association component 632 to associate bounding boxes with tracks for objects. In examples, the association component 632 may correspond to the association component 306 of FIG. 3. Further, the perception component 622 may include a bounding box selector 634 that implements a machine learned model 636 to select a bounding box for a situation. In examples, the bounding box selector 634 may correspond to the bounding box selector 314 of FIG. 3, and the machine learned model 636 may correspond to the machine learned model 118 of FIG. 1, the machine learned model 222 of FIG. 2, and/or the machine learned model 316 of FIG. 3. The perception component 622 may also include an object tracker 638 to track an object. In examples, the object tracker 638 may correspond to the object tracker 320 of FIG. 3.

In examples, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique.

In at least one example, the one or more system controllers 626 may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include the one or more maps 628 that may be used by the vehicle 602 to navigate within the environment. For example, a map may be any number of data structures modeled in two dimensions or three dimensions that are capable of providing information about an environment, such as, but not limited to, topologies (such as intersections), streets, mountain ranges, roads, terrain, and the environment in general. In one example, a map may include a three-dimensional mesh. In some instances, the map may be stored in a tiled format, such that individual tiles of the map represent a discrete portion of an environment, and may be loaded into working memory as needed. In some instances, the map(s) 628 may be divided into tiles by the vehicle computing device 604, by a computing device(s) 640, or by a combination of the two.

In some examples, the one or more maps 628 may be stored on a remote computing device(s) (such as the computing device(s) 640) accessible via network(s) 642. In some examples, multiple maps 628 may be stored based on, for example, a characteristic (e.g., type of entity, time of day, day of week, season of the year, etc.). Storing multiple maps 628 may have similar memory requirements, but increase the speed at which data in a heat map may be accessed.

In some instances, aspects of some or all of the components discussed herein may include any models, algorithms, and/or machine learning algorithms. For example, in some instances, the components in the memory 618 may be implemented as a neural network.

As described herein, an exemplary neural network is a biologically inspired algorithm which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet60, ResNet101, VGG, DenseNet, PointNet, and the like.

In at least one example, the sensor system(s) 606 may include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the LIDAR sensors may include individual LIDAR sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, and/or alternatively, the sensor system(s) 606 may send sensor data, via the one or more networks 642, to the one or more computing device(s) 640 at a particular frequency, after a lapse of a predetermined period of time, in near real-time, etc.

The vehicle 602 may also include the one or more emitters 608 for emitting light and/or sound, as described above. The emitters 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 may also include the one or more communication connection(s) 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., other nearby vehicles, traffic signals, etc.). The communication connection(s) 610 also enable the vehicle 602 to communicate with a remote teleoperations computing device or other remote services.

The communications connection(s) 610 may include physical and/or logical interfaces for connecting the vehicle computing device 604 to another computing device or a network, such as the network(s) 642. For example, the communications connection(s) 610 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include the one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 614. Furthermore, the drive system(s) 614 also include one or more communication connection(s) that enable communication by the respective drive module with one or more other local or remote computing device(s).

In at least one example, the localization component 620, perception component 622, and/or the planning component 624 may process sensor data, as described above, and may send their respective outputs, over the one or more network(s) 642, to the one or more computing device(s) 640. In at least one example, the localization component 620, the perception component 622, and/or the planning component 624 may send their respective outputs to the one or more computing device(s) 642 at a particular frequency, after a lapse of a predetermined period of time, in near real-time, etc.

The vehicle 602 may send sensor data to the one or more computing device(s) 640, via the network(s) 642. In some examples, the vehicle 602 may send raw sensor data to the computing device(s) 640. In other examples, the vehicle 602 may send processed sensor data and/or representations of sensor data to the computing device(s) 640. In some examples, the vehicle 602 may send sensor data to the computing device(s) 640 at a particular frequency, after a lapse of a predetermined period of time, in near real-time, etc. In some cases, the vehicle 602 may send sensor data (raw or processed) to the computing device(s) 640 as one or more log files. The computing device(s) 640 may receive the sensor data (raw or processed) and may generate and/or update maps based on the sensor data.

In examples, the vehicle 602 may generate various log file(s) representing sensor data captured by the vehicle 602. For example, a log file may include, but is not limited to, sensor data captured by one or more sensors of the vehicle 602 (e.g., LIDAR sensors, radar sensors, sonar sensors, wheel encoders, inertial measurement units (IMUs) (which may include gyroscopes, magnetometers, accelerometers, etc.), GPS sensors, image sensors, and the like), route information, localization information, and the like. In some cases, a log file(s) may include a log of all sensor data captured by the vehicle 602, decisions made by the vehicle 602, determinations made regarding segmentation and/or classification, and the like. A log files(s) may be sent to and received by the computing device(s) 640.

In at least one example, the computing device(s) 640 may include one or more processors 644 and memory 646 communicatively coupled with the one or more processors 644. In the illustrated example, the memory 646 stores a training component 648 that may train the machine learned model 636 according to any of the techniques discussed herein. The training component 648 may train the machine learned model 636 at any time, such as while offline, and then send the machine learned model 636 to the vehicle 602 over the network(s) 642 to be implemented by the vehicle 602. In examples, the training component 648 corresponds to the training component 212 of FIG. 2.

Although illustrated as being implemented on the computing device(s) 640, the training component 648 may be implemented on the vehicle 602, such as stored within the memory 618 of the vehicle computing device 604 and executed by the processor(s) 616 of the vehicle computing device 604. Further, any of the components of the vehicle computing device(s) 604 may alternatively, or additionally, be implemented by the computing device(s) 640.

The processor(s) 616 of the vehicle 602 and the processor(s) 644 of the computing device(s) 640 may be any suitable processor capable of executing instructions to process data and perform operations as described herein. By way of example and not limitation, the processor(s) 616 and 644 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618 and memory 646 are examples of non-transitory computer-readable media. Memory 618 and memory 646 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 6 is illustrated as a distributed system, in alternative examples, components of the vehicle 602 may be associated with the computing device(s) 640 and/or components of the computing device(s) 640 may be associated with the vehicle 602. That is, the vehicle 602 may perform one or more of the functions associated with the computing device(s) 640, and vice versa.

Example Clauses

A. A method comprising: receiving sensor data from one or more sensors associated with an autonomous vehicle, the sensor data representative of an object in an environment; determining, based at least in part on the sensor data, a first three-dimensional bounding box representing the object and a second three-dimensional bounding box representing the object; inputting the first and second three-dimensional bounding boxes into a machine learned model; receiving, from the machine learned model, a selected three-dimensional bounding box comprising either the first three-dimensional bounding box or the second three-dimensional bounding box; updating, as an updated track, an object track based at least in part on the selected three-dimensional bounding box, the updated track comprising one or more of historical positions, historical velocities, historical orientations, or historical accelerations of the object; determining a trajectory based at least in part on the updated track; and controlling the autonomous vehicle based at least in part on the trajectory.

B. The method of example A, wherein determining the first three-dimensional bounding box comprises determining, based at least in part on the sensor data and with a first technique, the first three-dimensional bounding box; and wherein determining the second three-dimensional bounding box comprises determining, based at least in part on the sensor data and with a second technique, the second three-dimensional bounding box.

C. The method of example A or B, wherein the sensor data comprises at least one of LIDAR data or image data.

D. The method of any of examples A through C, wherein the inputting comprises inputting characteristic data into the machine learned model, the characteristic data indicating at least one of: a velocity of the object; a velocity of the autonomous vehicle; a distance from the autonomous vehicle to the object; a geolocation; a confidence associated with a technique used to determine at least one of the first three-dimensional bounding box or the second three-dimensional bounding box; a number of frames associated with the track; a proximity of the autonomous vehicle or the object to a road feature; or a ratio of empty space to occupied space within the selected three-dimensional bounding box.

E. The method of any of examples A through D, wherein controlling the autonomous vehicle comprises tracking the object using at least one of a Kalman filter or an Extended Kalman filter.

F. A system comprising: one or more processors; and memory storing executable instructions that, when executed by the one or more processors, cause the one or more processors to perform operations comprising: receiving sensor data from one or more sensors associated with a vehicle; determining, based at least in part on the sensor data, a first bounding box and a second bounding box associated with an object in an environment proximate the vehicle; inputting the first bounding box and the second bounding box into a machine learned model; receiving, from the machine learned model, an output bounding box; associating the output bounding box with a track of the object; and controlling the vehicle based at least in part on the output bounding box.

G. The system of example F, wherein determining the first bounding box comprises determining, based at least in part on the sensor data and with a first technique, the first bounding box; and wherein determining the second bounding box comprises determining, based at least in part on the sensor data and with a second technique, the second bounding box.

H. The system of example F or G, wherein the output bounding box comprises either the first bounding box or the second bounding box.

I. The system of any examples of F through H, wherein the output bounding box comprises a bounding box that is determined by the machine learned model based on at least one of the first bounding box or the second bounding box.

J. The system of any of examples F through J wherein the instructions further cause the one or more processors to input, into the machine learned model, data indicating at least one of a velocity of the object or a velocity of the vehicle.

K. The system of any of examples F through J, wherein the instructions further cause the one or more processors to input, into the machine learned model, data indicating at least one of a distance from the vehicle to the object or a number of frames associated with the track.

L. The system of any of examples F through K, wherein the instructions further cause the one or more processors to input, into the machine learned model, data indicating at least one of a proximity of the vehicle or the object to a road feature, a ratio of empty space to occupied space within the output bounding box, or a confidence associated with a technique used to determine at least one of the first bounding box or the second bounding box.

M. One or more non-transitory computer-readable media storing instructions that, when executed, cause one or more processors to perform acts comprising: receiving sensor data from one or more sensors associated with a vehicle; determining, based at least in part on the sensor data, a first bounding box and a second bounding box associated with an object in an environment proximate the vehicle; selecting, as a selected bounding box and using a machine learned model, either the first bounding box or the second bounding box; and associating the selected bounding box with a track of the object, the track indicative of one or more of historical positions of the object, historical velocities of the object, an extent of the object, or historical accelerations of the object.

N. The one or more non-transitory computer-readable media of example M, wherein determining the first bounding comprises determining, based at least in part on the sensor data and with a first technique, the first bounding box; and wherein determining the second bounding box comprises determining, based at least in part on the sensor data and with a second technique, the second bounding box.

O. The one or more non-transitory computer-readable media of examples M or N, wherein the sensor data comprises at least one of LIDAR data or image data.

P. The one or more non-transitory computer-readable media of any of examples M through O, wherein selecting either the first bounding box or the second bounding box is based on at least one of a velocity of the object or a velocity of the vehicle.

Q. The one or more non-transitory computer-readable media of any of examples M through P, wherein selecting either the first bounding box or the second bounding box is based on at least one of a distance from the vehicle to the object or a number of frames associated with the track.

R. The one or more non-transitory computer-readable media of any of examples M through Q, wherein selecting either the first bounding box or the second bounding box is based on at least one of a distance of the vehicle or the object to a road feature or a confidence associated with a technique used to determine at least one of the first bounding box or the second bounding box.

S. The one or more non-transitory computer-readable media of any of examples M through R wherein selecting either the first bounding box or the second bounding box is based at least in part on an amount of empty space within the selected bounding box.

T. The one or more non-transitory computer-readable media of any of examples M through S, wherein the acts further comprise: determining a trajectory for the vehicle based at least in part on the selected bounding box; and controlling the vehicle based at least in part on the trajectory.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method comprising:
receiving sensor data from one or more sensors associated with an autonomous vehicle, the sensor data representative of an object in an environment;
determining, based at least in part on the sensor data, a first three-dimensional bounding box representing the object and a second three-dimensional bounding box representing the object;
inputting the first and second three-dimensional bounding boxes into a machine learned model;
receiving, from the machine learned model, a selected three-dimensional bounding box comprising either the first three-dimensional bounding box or the second three-dimensional bounding box;
updating, as an updated track, an object track based at least in part on the selected three-dimensional bounding box, the updated track comprising one or more of historical positions, historical velocities, historical orientations, or historical accelerations of the object;
determining a trajectory based at least in part on the updated track; and
controlling the autonomous vehicle based at least in part on the trajectory.

2. The method of claim 1, wherein determining the first three-dimensional bounding box comprises determining, based at least in part on the sensor data and with a first technique, the first three-dimensional bounding box; and
wherein determining the second three-dimensional bounding box comprises determining, based at least in part on the sensor data and with a second technique different than the first technique, the second three-dimensional bounding box.

3. The method of claim 2, wherein the sensor data comprises LIDAR data and the first technique comprises a LIDAR-based bounding box generation technique, and wherein the sensor data comprises image data and the second technique comprises an image-based bounding box generation technique.

4. The method of claim 1, wherein the inputting comprises inputting characteristic data into the machine learned model, the characteristic data indicating at least one of:
a velocity of the object;
a velocity of the autonomous vehicle;
a distance from the autonomous vehicle to the object;
a geolocation;
a confidence associated with a technique used to determine at least one of the first three-dimensional bounding box or the second three-dimensional bounding box;
a number of frames associated with the track;
a proximity of the autonomous vehicle or the object to a road feature; or
a ratio of empty space to occupied space within the selected three-dimensional bounding box.

5. The method of claim 1, wherein controlling the autonomous vehicle comprises tracking the object using at least one of a Kalman filter or an Extended Kalman filter.

6. A system comprising:
one or more processors; and
memory storing executable instructions that, when executed by the one or more processors, cause the one or more processors to perform operations comprising:
receiving sensor data from one or more sensors associated with a vehicle;
determining, based at least in part on the sensor data, a first bounding box and a second bounding box associated with an object in an environment proximate the vehicle;
inputting the first bounding box and the second bounding box into a machine learned model;
receiving, from the machine learned model, an output bounding box;
associating the output bounding box with a track of the object; and
controlling the vehicle based at least in part on the output bounding box.

7. The system of claim 6, wherein determining the first bounding box comprises determining, based at least in part on the sensor data and with a first technique, the first bounding box; and
wherein determining the second bounding box comprises determining, based at least in part on the sensor data and with a second technique different than the first technique, the second bounding box.

8. The system of claim 6, wherein the output bounding box comprises either the first bounding box or the second bounding box.

9. The system of claim 6, wherein the output bounding box comprises a third bounding box that is different than the first bounding box and the second bounding box, wherein the third bounding box is determined by the machine learned model based on at least one of the first bounding box or the second bounding box.

10. The system of claim 6, wherein the instructions further cause the one or more processors to input, into the machine learned model, data indicating at least one of a velocity of the object or a velocity of the vehicle.

11. The system of claim 6, wherein the instructions further cause the one or more processors to input, into the machine learned model, data indicating at least one of a distance from the vehicle to the object or a number of frames associated with the track.

12. The system of claim 6, wherein the instructions further cause the one or more processors to input, into the machine learned model, data indicating at least one of a proximity of the vehicle or the object to a road feature, a ratio of empty space to occupied space within the output bounding box, or a confidence associated with a technique used to determine at least one of the first bounding box or the second bounding box.

13. One or more non-transitory computer-readable media storing instructions that, when executed, cause one or more processors to perform acts comprising:
receiving sensor data from one or more sensors associated with a vehicle;
determining, based at least in part on the sensor data, a first bounding box and a second bounding box associated with an object in an environment proximate the vehicle;
selecting, as a selected bounding box and using a machine learned model, either the first bounding box or the second bounding box; and
associating the selected bounding box with a track of the object, the track indicative of one or more of historical positions of the object, historical velocities of the object, an extent of the object, or historical accelerations of the object.

14. The one or more non-transitory computer-readable media of claim 13, wherein determining the first bounding box comprises determining, based at least in part on the sensor data and with a first technique, the first bounding box; and
wherein determining the second bounding box comprises determining, based at least in part on the sensor data and with a second technique different than the first technique, the second bounding box.

15. The one or more non-transitory computer-readable media of claim 14, wherein the sensor data comprises LIDAR data and the first technique comprises a LIDAR-based bounding box generation technique, and wherein the sensor data comprises image data and the second technique comprises an image-based bounding box generation technique.

16. The one or more non-transitory computer-readable media of claim 13, wherein selecting either the first bounding box or the second bounding box is based on at least one of a velocity of the object or a velocity of the vehicle.

17. The one or more non-transitory computer-readable media of claim 13, wherein selecting either the first bounding box or the second bounding box is based on at least one of a distance from the vehicle to the object or a number of frames associated with the track.

18. The one or more non-transitory computer-readable media of claim 13, wherein selecting either the first bounding box or the second bounding box is based on at least one of a distance of the vehicle or the object to a road feature or a confidence associated with a technique used to determine at least one of the first bounding box or the second bounding box.

19. The one or more non-transitory computer-readable media of claim 13, wherein selecting either the first bounding box or the second bounding box is based at least in part on an amount of empty space within the selected bounding box.

20. The one or more non-transitory computer-readable media of claim 13, wherein the acts further comprise:
determining a trajectory for the vehicle based at least in part on the selected bounding box; and
controlling the vehicle based at least in part on the trajectory.

* * * * *